United States Patent [19]
Minefuji

[11] Patent Number: 5,504,625
[45] Date of Patent: Apr. 2, 1996

[54] VARIABLE POWER PROJECTION LENS

[75] Inventor: Nobutaka Minefuji, Hokkaido, Japan

[73] Assignee: Asahi Kogaku Kogyo Kabushiki Kaisha, Tokyo, Japan

[21] Appl. No.: 120,233

[22] Filed: Sep. 14, 1993

Related U.S. Application Data

[63] Continuation of Ser. No. 772,873, Oct. 8, 1991, abandoned.

[30] Foreign Application Priority Data

Oct. 9, 1990 [JP] Japan .................................. 2-271197
Sep. 12, 1991 [JP] Japan .................................. 3-233165

[51] Int. Cl.⁶ .................................................. G02B 15/14
[52] U.S. Cl. ........................... 359/687; 359/676; 359/686
[58] Field of Search ..................... 359/687, 686, 359/676, 469, 744, 771, 747

[56] References Cited

U.S. PATENT DOCUMENTS

| | | | |
|---|---|---|---|
| 4,690,513 | 9/1987 | Takahashi et al. ................. | 359/686 |
| 4,854,684 | 8/1989 | Horiuchi ............................ | 359/687 |
| 4,913,540 | 4/1990 | Minefuji . | |
| 4,981,352 | 1/1991 | Tejima et al. . | |

FOREIGN PATENT DOCUMENTS

| | | | |
|---|---|---|---|
| 58-65407 | 4/1983 | Japan ............................ | 359/687 |
| 58-116509 | 7/1983 | Japan ............................ | 359/687 |
| 61-90120 | 5/1986 | Japan ............................ | 359/774 |
| 61-138913 | 6/1986 | Japan ............................ | 359/774 |

*Primary Examiner*—William L. Sikes
*Assistant Examiner*—Hung Xuan Dang
*Attorney, Agent, or Firm*—Sandler Greenblum & Bernstein

[57] ABSTRACT

A variable power projection lens is provided and includes, in order from an magnifying side (a screen side), a first lens group having positive power, a second lens group having negative power, a third lens group having positive power, and a fourth lens group having positive power. At least two lens groups of the first, second, and third lens groups are movable along the optical-axis direction to vary the image magnification and to focus, and the variable power projection lens satisfies the following condition:

$$|f\alpha| > 5fw$$

where
 $f\alpha$: the synthetic focal length at the wide end from the first lens group to the third lens group; and
 $fw$: the focal length at the wide end of the overall lens system.

11 Claims, 8 Drawing Sheets

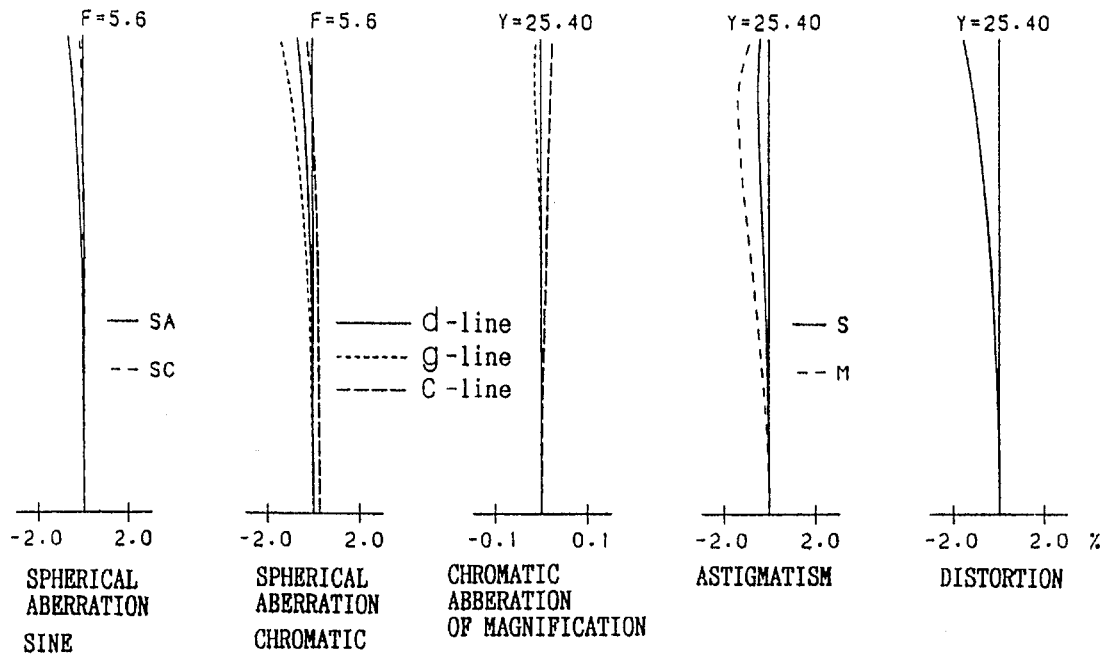
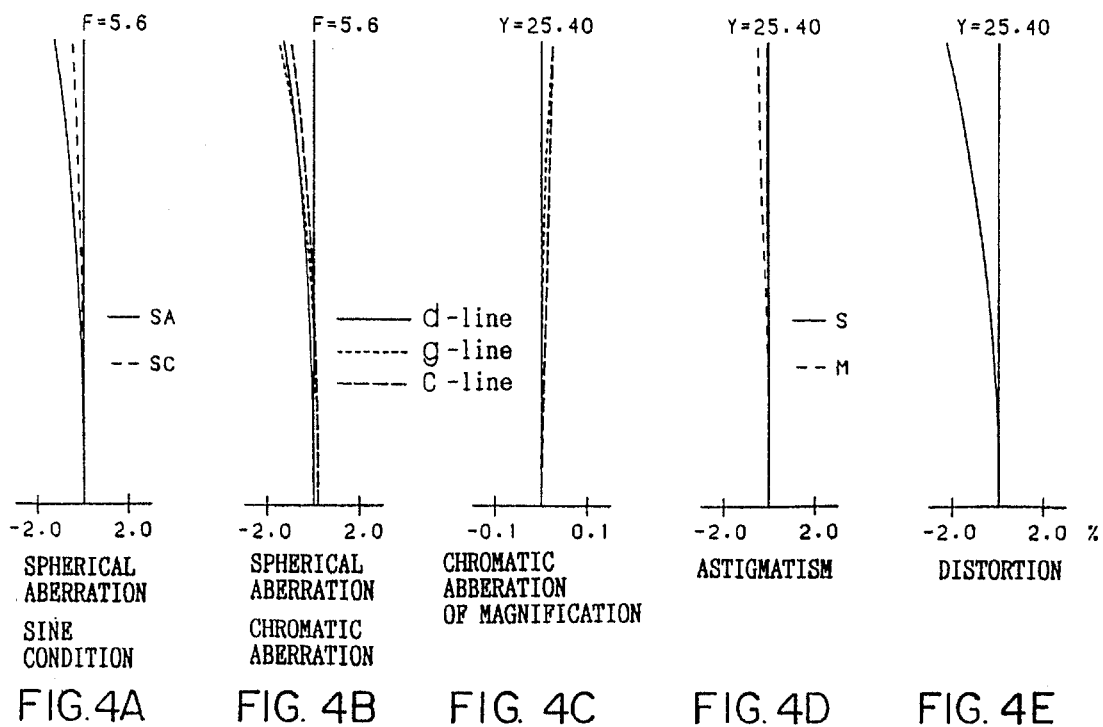

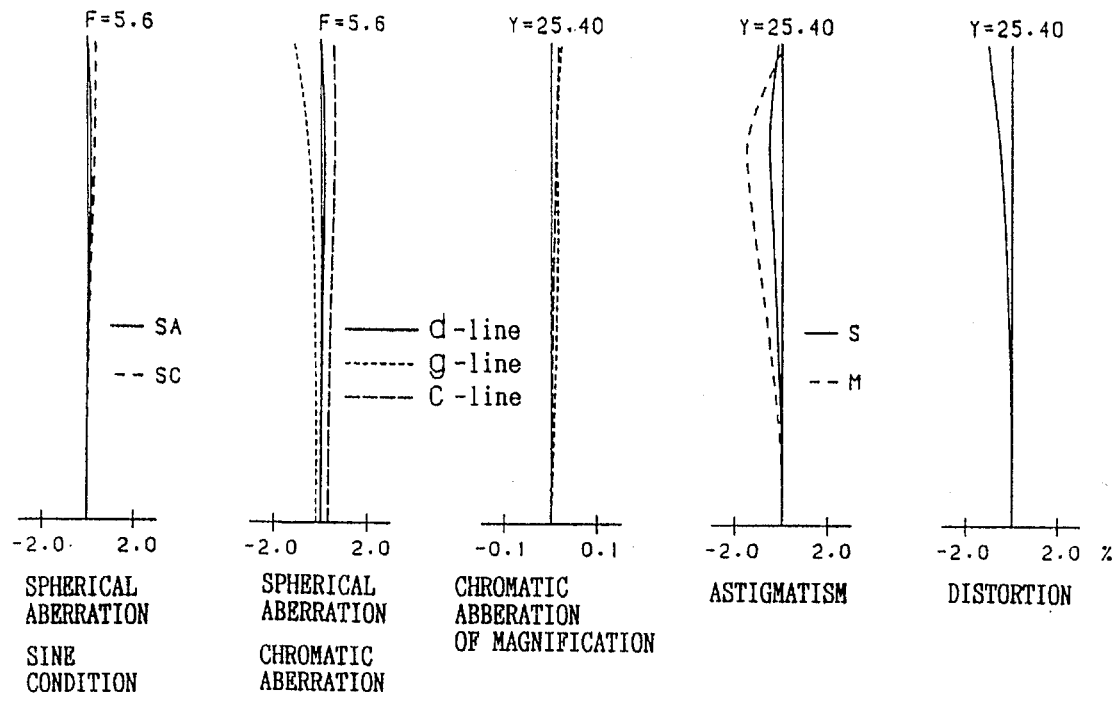
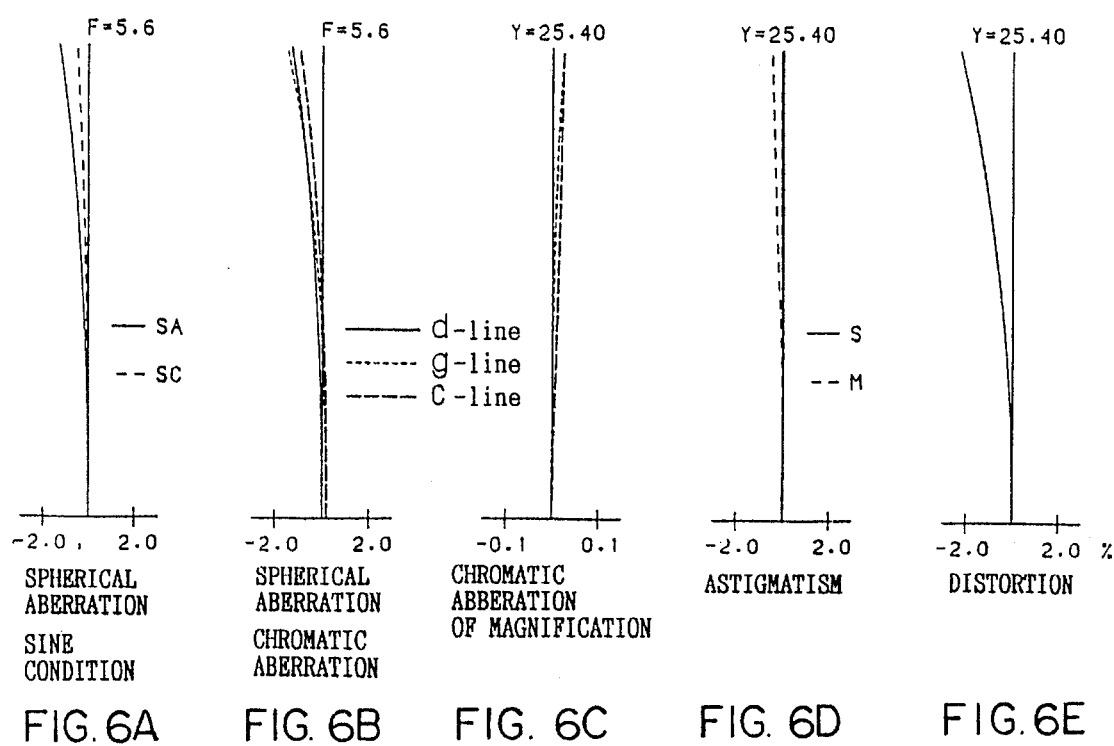

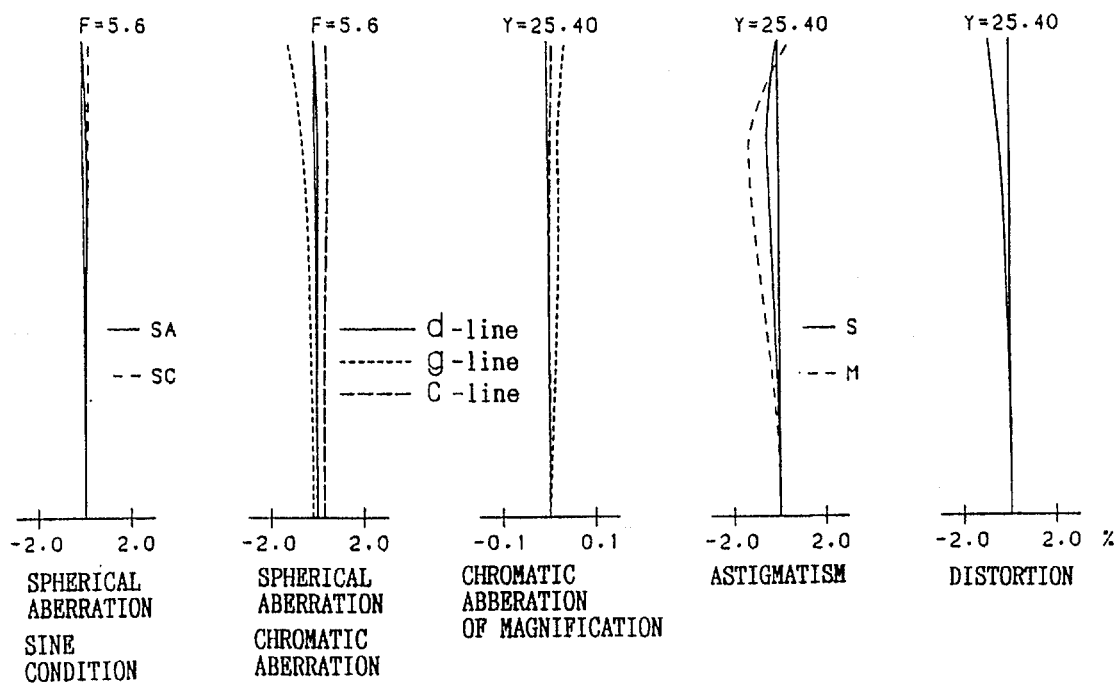

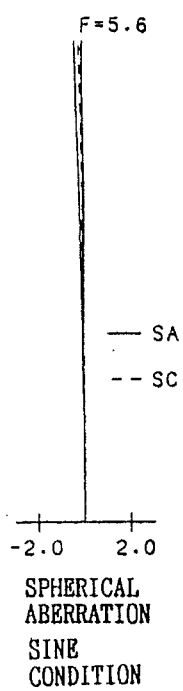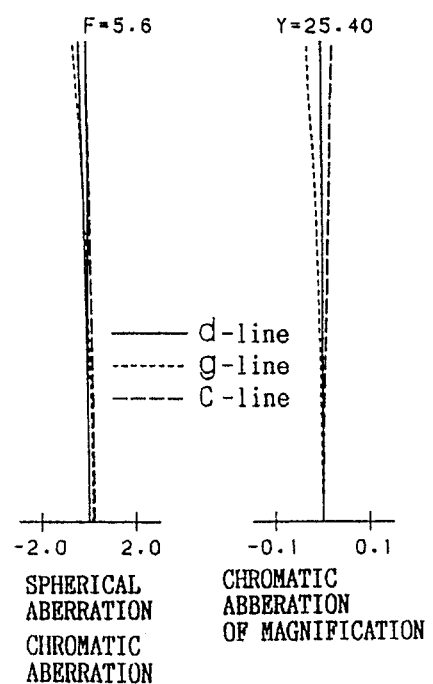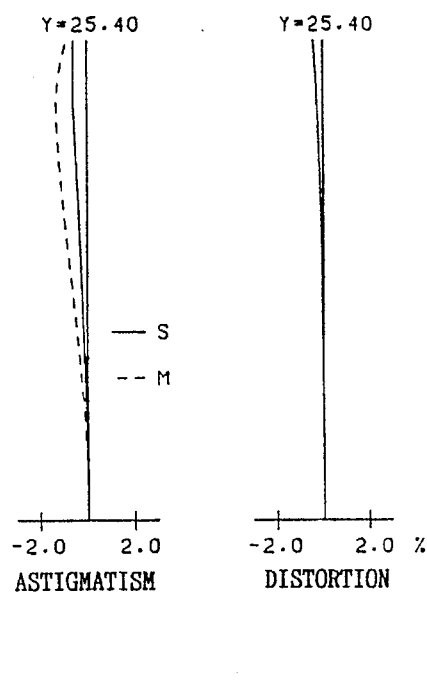
FIG. 10A  FIG. 10B  FIG. 10C  FIG. 10D  FIG. 10E

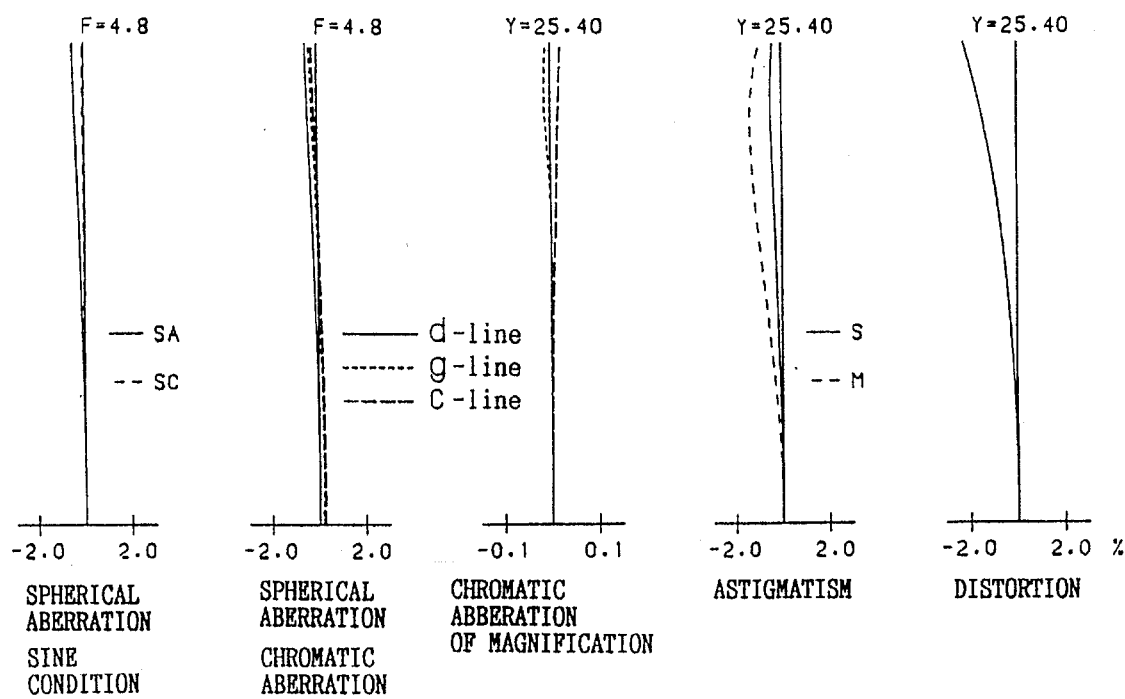

VARIABLE POWER PROJECTION LENS

This application is a continuation of application Ser. No. 07/722,873, filed Oct. 8, 1991, now abandoned.

BACKGROUND OF THE INVENTION

1. Field of the Invention

The present invention relates to a variable power projection lens for an optical projector such as for example a projection television.

2. Description of the Prior Art

Conventionally, there is known an optical projector for producing a large television picture by projecting a small television picture onto a screen at an enlarged size. In this type of projector, separate monochromatical B (blue), G (green) and R (red) images are projected onto the screen via three respective projection lenses, with the B, G and R images being superimposed on the screen so as to form a colored image.

Such projectors, however, have drawbacks in that, first, the need for three separate lenses for projecting B, G and R images results in a high cost and an ampler space for the optical system, and, second, it is very difficult to make the respective B, G and R images coincide.

To solve the problems, a projector has been used wherein dichroic prisms or dichroic mirrors combine light beams of B, G and R images, and then it is projected onto the screen using a single projection lens.

The projection lens of the projector therewith requires objective-sided telecentricity for prevention against color shading and a long back focus for inserting the prisms or mirrors into an optical path between the small television image and the projection lens.

Further, it necessitates a variable focal length for projecting an optionally magnified image onto an optionally sized screen which is separate from the projector.

SUMMARY OF THE INVENTION

An object, therefore, of the present invention is to provide a variable power projection lens which possesses an adequate long back focus, good telecentricity, and a variable focal length.

The variable power projection lens of the present invention for achieving the above-memtioned object comprises, in order from a magnifying side, a first lens group having positive power, a second lens group having negative power, a third lens group having positive power, and a fourth lens group having positive power, AT least two lens groups of the first, second, and third lens groups are movable optical-axially, and the variable power projection lens satisfies the following condition:

$$|f\alpha| > 5fw$$

where $f\alpha$: the composite focal length (i.e., the focal length of the optical system) at the wide end from the first lens group to the third lens group; and $fw$: the focal length at the wide end of the overall lens system.

BRIEF DESCRIPTION OF THE DRAWINGS

FIGS. 3A–3E are graphs showing aberrations at a magnification of −0.06(on the minifying side) at the tele end by moving the second and third lens groups of Embodiment 1 to vary the image magnification and to focus.

FIGS. 4A–4E are graphs showing aberrations at a magnification of −0.02(on the minifying side) at the wide end by moving the first and second lens groups of Embodiment 1 to vary the image magnification and to focus.

FIGS. 5A–5E are graphs showing aberrations at a magnification of −0.06(on the minifying side) at the tele end by moving the first and second lens groups of Embodiment 1 to vary the image magnification and to focus.

FIGS. 6A–6E are graphs showing aberrations at a magnification of −0.02(on the minifying side) at the wide end by moving the first, second, and third lens groups of Embodiment 1 to vary the image magnification and to focus.

FIGS. 7A–7E are graphs showing aberrations at a magnification of −0.06(on the minifying side) at the tele end by moving the first, second, and third lens groups of Embodiment 1 to vary the image magnification and to focus.

FIGS. 10A–10E are graphs showing aberrations at a magnification of −0.06(on the minifying side) at the tele end by moving the second and third lens groups of Embodiment 2 to vary the image magnification and to focus.

FIGS. 13A–13E are graphs showing aberrations at a magnification of −0.06(on the minifying side) at the tele end by moving the second and third lens groups of Embodiment 3 to vary the image magnification and to focus.

DETAILED DESCRIPTION OF THE EMBODIMENTS

Figure 1:
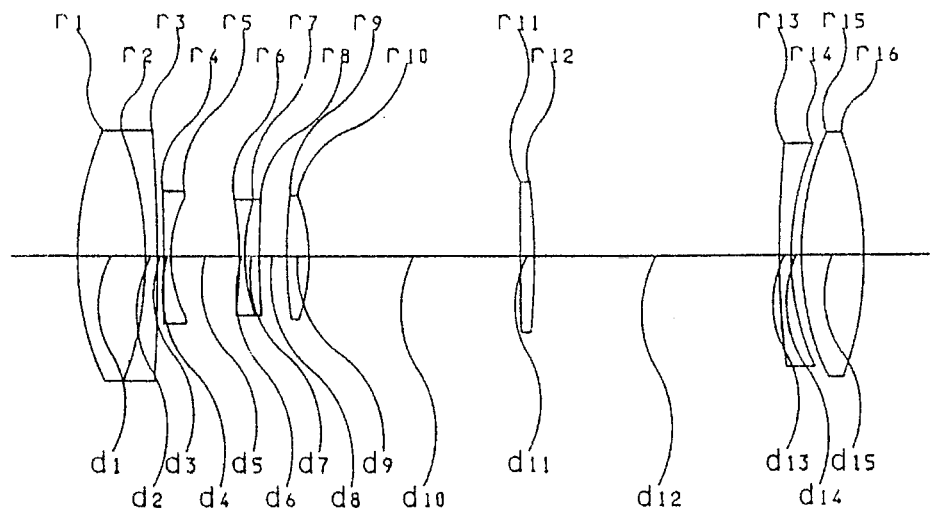
FIG. 1 is a drawing a lens system at the wide, end illustrating Embodiment 1 of a variable power projection lens of the invention.
Figures 2A, 2B, 2C, 2D, 2E:
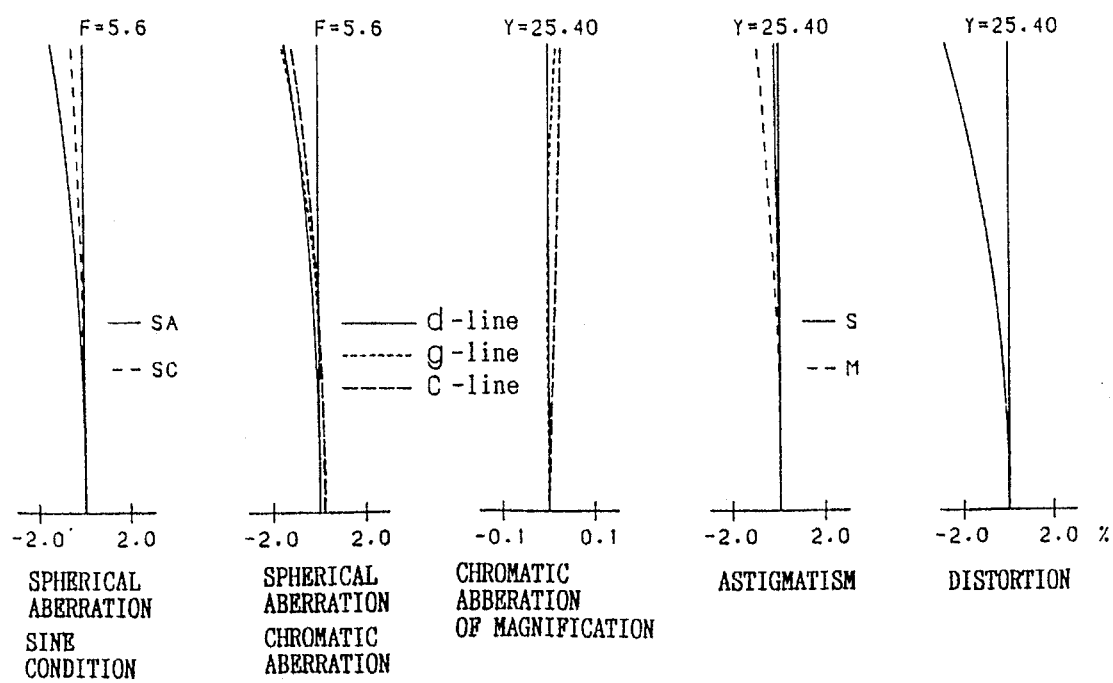
FIG. 2A–2E are graphs showing aberrations at a magnification of −0.02(on the minifying or reducing side) at the wide end by moving second and third lens groups of Embodiment 1 to vary the image magnification and to focus.

The embodiments of the present invention will now be described hereinafter with reference to the drawings.

The present disclosure relates to subject matter contained in Japanese patent application Nos. 2-271197(filed on Oct. 9, 1990) and 3-233165 (filed on Sep. 12, 1991), which are expressly incorporated herein by reference in their entireties.

A variable power projection lens of the present invention comprises, in order from a magnifying side (a screen side), a first lens group having positive power, a second lens group having negative power, a third lens group having positive power, and a fourth lens group having positive power. At least two lens groups of the first, second and third lens groups are movable optical-axially, and the variable power projection lens satisfies the following condition:

$$|f\alpha|>5fw \qquad (1)$$

where fα: the composite focal length at the wide end from the first lens group to the third lens group;and fw: the focal length at the wide end of the overall lens system.

A long back focus and preferable telecentricity are obtained by satisfying the condition (1).

The condition (1) sets forth the requirement that should be satisfied when the second and third lens groups are moved to vary the image magnification, and then the three lens groups including the first lens group are moved to focus, and the fourth lens group acts to greatly separate a main light beam from the optical path so as to be telecentric on the minifying side. Accordingly, the first to third lens groups can possess weak positive or negative power.

It is difficult to reduce coma, when a synthetic focal length fα is negative and additionally the condition (1) is not satisfied, because negative power of the second lens, which only possesses negative power among the lens groups, becomes excessive. Further, a high cost will be paid to bigger proportions of the fourth lens group, which are required due to increased convergence of a light beam incident upon the third lens group via the fourth lens group.

To the contrary, it is difficult to lengthen a back focus and obtain preferable telecentricity, when a composite focal length fα is positive and additionally the condition (1) is not satisfied, due to increased divergence of a light beam incident upon the third lens group via the fourth lens group.

Retainment of the reduced power of the first, second, and third lens groups allows the fourth lens group to be composed of only two lenses, negative and positive. Although the shape of the fourth lens group is inevitably enlarged in order to obtain good telecentricity, the composition of the fourth lens group using the two lenses results in a low manufacturing cost.

Lenses of the embodiments satisfy the following condition:

$$fbw/fw>1.75 \qquad (2)$$

where fbw: the back focus at the wide end of the overall lens system.

When the condition (2) is also satisfied as well as the condition (1), good telecentricity and a long back focus are brought on.

Preferably, the fourth lens group is constituted such that a negative lens of which the concave surface faces the minifying side and a double convex lens are disposed in order from the magnifying side according to the following conditions:

$$0.80<rm/rp<1.00 \qquad (3)$$

$$1.5<f4/fw<2.5 \qquad (4)$$

where rp: the radius of curvature of the surface of the negative lens facing the double convex lens;

rm: the radius of curvature of the surface of the double convex lens facing the negative lens;and f4: the focal length of the fourth lens group.

The condition (3) concerns the constitution of the two lenses of the fourth lens group. The combination of the radii of curvature according to the condition (3) brings on good performance of the projection lens as a system, with aberrations being preferably corrected in the first to third lens groups. It is, however, difficult to especially correct spherical aberration and coma if the condition (3) is not satisfied.

The condition (4), which concerns the power of the fourth lens group, shows the requirement for obtaining a long back focus. If the value of f4/fw is below 1.5, the power of the fourth lens group becomes so excessive that it is impossible to obtain a long back focus. If it is more than 2.5, the powers of the respective lens groups become weakened, so that the overall length of the lens system turns long.

The third lens group, which is composed of a single positive lens, preferably satisfies the following condition:

$$f3>1.5fw \qquad (5)$$

where f3: the focal length of the third lens group;and fw: the focal length at the wide end of the overall lens system.

The condition (5), which concerns the power of the third lens group, shows the requirement for moderately control the fluctuation of aberration when varying the image magnification and proportionately compensating for aberrations. If the condition (5) is not satisfied, it is difficult to reduce spherical aberration and coma when varying, and distortion at the wide end is increased. The second lens group, which includes a positive convex lens disposed closest to the minifying side of which the radius of curvature of the minifying sided-surface is R2, preferably satisfies the following condition:

$$-0.8fw<R2<-0.3fw \qquad (6)$$

The radius of curvature R2 below −0.8fw makes it difficult to slightly reduce the curvature of field and the coma especially at the tele end and further it increases the distortion at the wide end. To the contrary, the radius of curvature R2 more than −0.3fw makes the sum of Petzval negative and makes the absolute value excessive, and further it increases the distortion and the curvature of field and makes it difficult to slightly reduce the spherical aberration and the coma flare.

EMBODIMENT 1

FIG. 1 shows a lens system at the wide end of Embodiment 1 of a variable power projection lens of the present invention.

Concrete numerical constructions thereof are shown in Table 1, in which FNo. denotes f-number; f, denote the focal length of the overall lens system; fb, denotes the back focus at the wide end; r, denotes the radius of curvature of the respective surfaces of the lenses; d, denotes lens thickness or the spatial distance; n, denotes the refractive index of the respective lenses at the d-line; ν, the Abbe number of the respective lenses at the d-line; and m, denotes magnification.

The spatial distance described as "variable" is determined by the method of varying and focusing. In Embodiment 1, three methods are given as shown in Tables 2, 3, and 4.

Table 2 shows values obtained by moving the second lens group to vary the image magnification, moving the third lens group to compensate for the displacement of the focal point caused by the variation, and to focus. FIGS. 2A–2E show various aberrations at a magnification of −0.02(on the minifying side) at the wide end of the above case, FIGS. 3A–3E showing those at a magnification of −0.06(on the minifying side) at the tele end of the same. Embodiments 2 and 3, described hereinafter, employ only values obtained by moving lenses according to the same method as in Table 2.

The above constitution brings on the needlessness of a cam for correspondently moving the second and third lens groups due to the turning of it into a varifocal lens, and a low cost of the lens moving mechanism. Further, due to the turning of it into an inner focus method, it brings on unchanging of the overall length of the lens system, and minimization of the moving portions and the overall lens system.

Table 3 shows values obtained by moving the second lens group to vary the image magnification, moving the first lens group to compensate for the displacement of the focal point caused by varying, and to focus. FIGS. 4A–4e show various aberrations at a magnification of −0.02(on the minifying side) at the wide end of the above case, FIGS. 5A–5E showing those at a magnification of −0.06(on the minifying side) at the tele end of the same.

This constitution brings on a zooming type by two lens groups using a cam, or a low cost accomplished by moving the first and second lens groups independently without a cam.

Table 4 shows values obtained by moving the second and third lens groups to vary the image magnification and to compensate the displacement of the focal point caused by varying, and moving the first lens group to focus. FIGS. 6A–6E show various aberrations at a magnification of −0.02(on the minilying side) at the wide end of the above case, FIGS. 7A–7E showing those at a magnification of −0.06(on the minifying side) at the tele end of the same.

This constitution brings on a zooming type by four lens groups, and simplification of the mechanism for moving the first lens group due to the only actuation of focusing of the first lens group independent of other lens groups.

TABLE 1

| | FNo. = 1:5.6 f = 80~120 mm fb = 170 mm | | | |
|---|---|---|---|---|
| Surface No. | r | d | n | v |
| 1 | 62.459 | 14.20 | 1.51633 | 64.1 |
| 2 | −73.640 | 2.50 | 1.62004 | 36.3 |
| 3 | −438.885 | variable | — | |
| 4 | −501.766 | 1.45 | 1.77250 | 49.6 |
| 5 | 26.501 | 14.63 | — | |
| 6 | −72.655 | 1.20 | 1.77250 | 49.6 |
| 7 | 36.880 | 3.00 | 1.80518 | 25.4 |
| 8 | 134.963 | 6.00 | — | |
| 9 | 97.117 | 4.80 | 1.48749 | 70.2 |
| 10 | −35.839 | variable | — | |
| 11 | 735.532 | 3.00 | 1.51633 | 64.1 |
| 12 | −150.572 | variable | — | |
| 13 | 199.033 | 2.50 | 1.72825 | 28.5 |
| 14 | 54.722 | 2.36 | — | |
| 15 | 59.385 | 13.50 | 1.51633 | 64.1 |
| 16 | −73.520 | — | — | |

TABLE 2

| m | d3 | d10 | d12 |
|---|---|---|---|
| f = 80 mm | | | |
| (∞) | 1.50 | 46.05 | 53.31 |
| −0.02 | 1.50 | 49.00 | 50.35 |
| −0.04 | 1.50 | 51.95 | 47.40 |
| f = 120 mm | | | |
| (∞) | 23.35 | 19.77 | 57.74 |
| −0.03 | 23.35 | 26.43 | 51.07 |

TABLE 2-continued

| m | d3 | d10 | d12 |
|---|---|---|---|
| −0.06 | 23.35 | 33.06 | 44.44 |

TABLE 3

| m | d3 | d10 | d12 |
|---|---|---|---|
| f = 80 mm | | | |
| (∞) | 1.50 | 46.05 | 53.31 |
| −0.02 | 5.17 | 46.05 | 53.31 |
| −0.04 | 8.84 | 46.05 | 53.31 |
| f = 120 mm | | | |
| (∞) | 23.27 | 19.96 | 53.31 |
| −0.03 | 26.94 | 19.96 | 53.31 |
| −0.06 | 30.61 | 19.96 | 53.31 |

TABLE 4

| m | d3 | d10 | d12 |
|---|---|---|---|
| f = 80 mm | | | |
| (∞) | 1.50 | 46.05 | 53.31 |
| −0.02 | 5.17 | 46.05 | 53.31 |
| −0.04 | 8.84 | 46.05 | 53.31 |
| f = 120 mm | | | |
| (∞) | 23.35 | 19.77 | 57.74 |
| −0.03 | 27.02 | 19.77 | 57.74 |
| −0.06 | 30.69 | 19.77 | 57.74 |

EMBODIMENT 2

Figure 8:
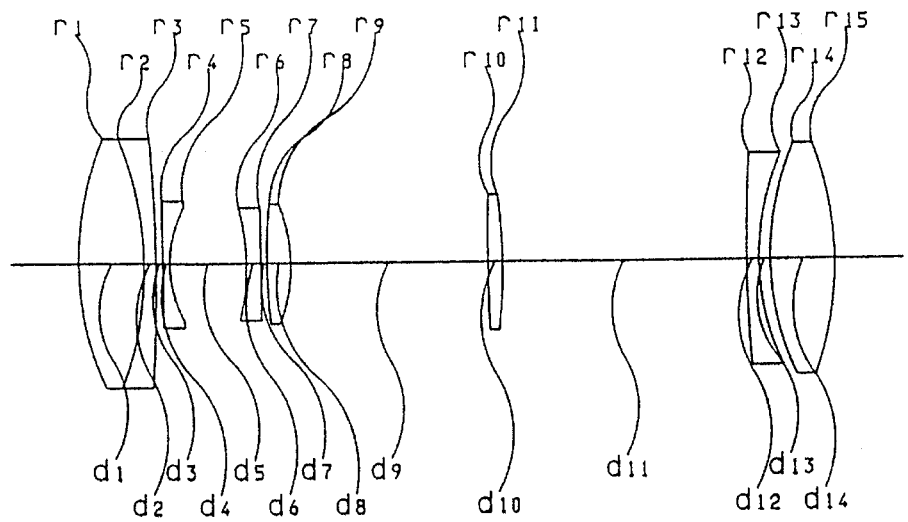
FIG. 8 is a drawing of a lens system at the wide end illustrating Embodiment 2 of a variable power projection lens of the invention.
Figures 9A, 9B, 9C, 9D, 9E:
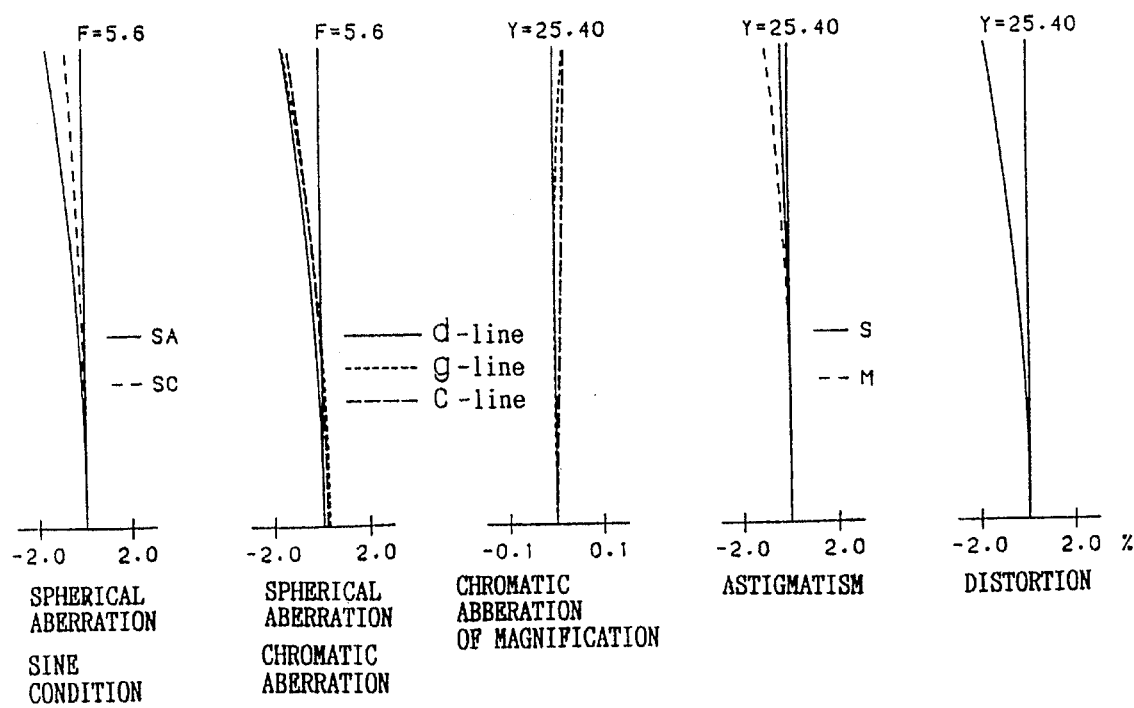
FIGS. 9A–9E are graphs showing aberrations at a magnification of −0.02(on the minifying side) at the wide end by moving second and third lens groups of Embodiment 2 to vary the image magnification and to focus.

FIG. 8 shows a lens system at the wide end of Embodiment 2 of a variable power projection lens of the present invention.

Concrete numerical constructions of Embodiment 2, which are obtained by moving the second and third lens groups to vary the image magnification and to focus, are described in Tables 5 and 6. FIGS 9A–9E shows various aberrations at a magnification of −0.02(on the minifying side) at the wide end of Embodiment 2, FIGS. 10A–10E showing those at a magnification of −0.06(on the minifying side) at the tele end of the same.

TABLE 5

| | FNo. = 1:5.6 f = 80~120 mm fb = 150.02 mm | | | |
|---|---|---|---|---|
| Surface No. | r | d | n | v |
| 1 | 64.389 | 13.50 | 1.51633 | 64.1 |
| 2 | −66.501 | 2.50 | 1.62004 | 36.3 |
| 3 | −301.357 | variable | — | |
| 4 | −1439.135 | 1.45 | 1.77250 | 49.6 |
| 5 | 23.611 | 16.07 | — | |
| 6 | −43.287 | 3.00 | 1.77250 | 49.6 |
| 7 | −1375.094 | 1.34 | — | |
| 8 | 124.961 | 5.00 | 1.58144 | 40.8 |
| 9 | −32.250 | variable | — | |
| 10 | 430.950 | 3.00 | 1.51633 | 64.1 |
| 11 | −107.424 | variable | — | |
| 12 | 315.124 | 2.50 | 1.72825 | 28.5 |
| 13 | 52.146 | 2.38 | — | |
| 14 | 57.396 | 13.50 | 1.51633 | 64.1 |

TABLE 5-continued

FNo. = 1:5.6 f = 80~120 mm fb = 150.02 mm

| Surface No. | r | d | n | v |
|---|---|---|---|---|
| 15 | −64.371 | — | — | |

TABLE 6

| m | d3 | d9 | d11 |
|---|---|---|---|
| | f = 80 mm | | |
| (∞) | 1.50 | 42.14 | 52.12 |
| −0.02 | 1.50 | 44.95 | 49.31 |
| −0.04 | 1.50 | 47.77 | 46.48 |
| | f = 120 mm | | |
| (∞) | 22.62 | 17.65 | 55.50 |
| −0.03 | 22.62 | 23.94 | 49.20 |
| −0.06 | 22.62 | 30.33 | 42.81 |

EMBODIMENT 3

Figure 11:
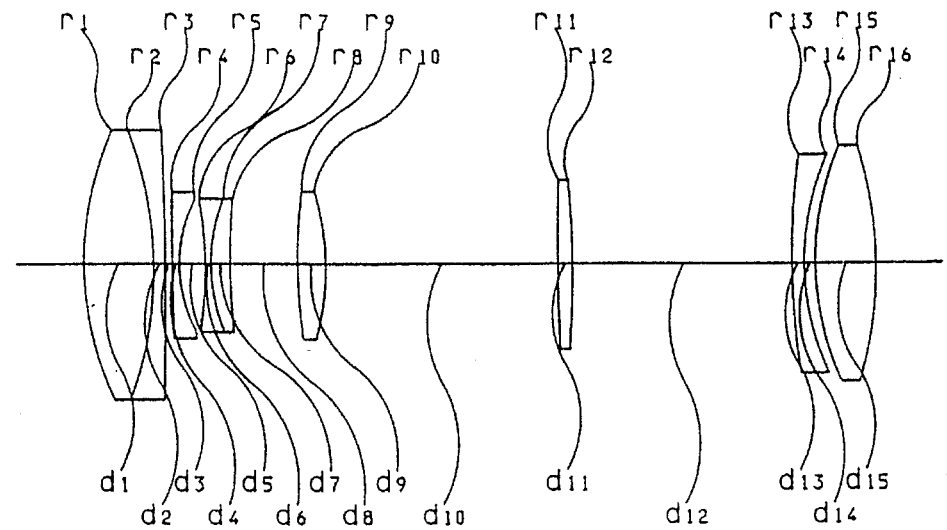
FIG. 11 is a drawing of a lens system at the wide end illustrating Embodiment 3 of a variable power projection lens of the invention.
Figures 12A, 12B, 12C, 12D, 12E:
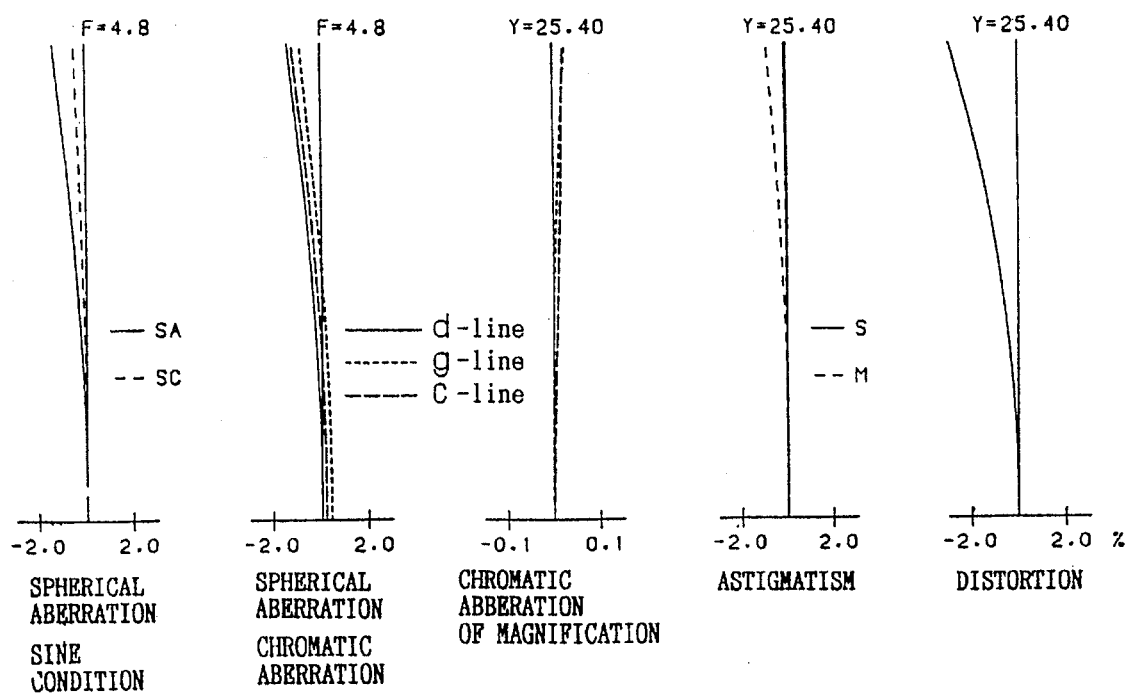
FIGS. 12A–12E are graphs showing aberrations at a magnification of −0.02(on the minifying side) at the wide end by moving second and third lens groups of Embodiment 3 to vary the image magnification and to focus.

FIG. 11 shows a lens system at the wide end of Embodiment 3 of a variable power projection lens of the present invention.

Concrete numerical constructions of Embodiment 3, which are obtained by moving the second and third lens groups to vary the image magnification and to focus, are described in Tables 7 and 8. FIGS. 12A–12E show various aberrations at a magnification of −0.02(on the minifying or reducing side) at the wide end of Embodiment 3, FIGS. 13A–13E showing those at a magnification of −0.06(on the minifying or reducing side) at the tele end of the same.

TABLE 7

FNo. = 1:4.8 f = 80~120 mm fb = 170.00 mm

| Surface No. | r | d | n | v |
|---|---|---|---|---|
| 1 | 64.017 | 15.00 | 1.51633 | 64.1 |
| 2 | −76.455 | 2.50 | 1.62004 | 36.3 |
| 3 | −668.136 | variable | — | |
| 4 | 1553.364 | 1.45 | 1.77250 | 49.6 |
| 5 | 28.808 | 5.52 | — | |
| 6 | −80.704 | 1.20 | 1.77250 | 49.6 |
| 7 | 36.592 | 4.00 | 1.80518 | 25.4 |
| 8 | 157.547 | 14.22 | — | |
| 9 | 115.942 | 6.00 | 1.48749 | 70.2 |
| 10 | −51.241 | variable | — | |
| 11 | 572.315 | 3.00 | 1.51633 | 64.1 |
| 12 | −194.478 | variable | — | |
| 13 | 164.724 | 2.50 | 1.72825 | 28.5 |
| 14 | 53.942 | 2.39 | — | |
| 15 | 58.519 | 13.20 | 1.51633 | 64.1 |
| 16 | −78.439 | — | — | |

TABLE 8

| m | d3 | d10 | d12 |
|---|---|---|---|
| | f = 80 mm | | |
| (∞) | 1.50 | 50.00 | 47.45 |
| −0.02 | 1.50 | 53.50 | 43.95 |
| −0.04 | 1.50 | 56.99 | 40.46 |

TABLE 8-continued

| m | d3 | d10 | d12 |
|---|---|---|---|
| | f = 120 mm | | |
| (∞) | 25.20 | 21.30 | 52.45 |
| −0.03 | 25.20 | 29.21 | 44.55 |
| −0.06 | 25.20 | 37.04 | 36.71 |

The following Table 9 shows the relationship between the conditions and respective Embodiments described hereinbefore. Table 9

TABLE 9

| | Embodiment 1 | Embodiment 2 | Embodiment 3 |
|---|---|---|---|
| (1) \|fα\| | 13.54 ·fw | 6.83 ·fw | 8.72 ·fw |
| (2)fbw/fw | 2.125 | 1.878 | 2.125 |
| (3)rm/rp | 0.921 | 0.909 | 0.922 |
| (4)f4/fw | 1.936 | 2.085 | 1.880 |
| (5) f3 | 3.03 ·fw | 2.09 ·fw | 3.52 ·fw |
| (6) R2 | −0.448fw | −0.403·fw | −0.641·fw |

As described above, therefore, the present invention can provide a variable power projection lens with a long back focus, good telecentricity, and further by satisfying the design conditions, small aberrations or flares, a compact shape, a simple mechanism, and a low manufacturing cost.

The variable power projection lens of the present invention can be utilized as both of a magnifying lens and a minifying lens. An image source such as a television is disposed on the minifying side and a projected surface, such as a screen, is on the magnifying side when the lens is used as the magnifying lens. To the contrary, the image source is on the magnifying side and the projected surface is on the minilying side when the lens is used as the minifying lens.

What is claimed is:

1. A variable power projection lens comprising, in order from a magnifying side, a first lens group having positive power, a second lens group having negative power, a third lens group having positive power, and a fourth lens group having positive power, wherein at least two lens groups of said first, second, and third lens groups are movable along the optical axis direction to vary an image magnification and to focus, said variable power projection lens satisfying the following condition:

fbw/fw>1.75 where fbw: the back focus at the wide end of the overall lens system; and fw: the focal length at the wide end of the overall lens system.

2. The variable power projection lens according to claim 1, wherein said variable power projection lens satisfies the following condition:

\|fα\|>5fw where fα: the composite focal length at the wide end from the first lens group to the third lens group.

3. A variable power projection lens comprising, in order from a magnifying side, a first lens group having positive power, a second lens group having negative power, a third lens group having positive power, and a fourth lens group having positive power, wherein at least two lens groups of said first, second, and third lens groups are movable along the optical axis direction to vary an image magnification and to focus, said variable power projection lens satisfying the following condition:

$$|f\alpha|>5fw$$

where
- $f\alpha$: the composite focal length at the wide end from the first lens group to the third lens group; and
- $fw$: the focal length at the wide end of the overall lens system;

wherein said fourth lens group comprises a negative lens and a double convex lens, and satisfies the following conditions:

$$0.80<rm/rp<1.00$$

$$1.5<f4/fw<2.5$$

where
- $rp$: the radius of curvature of the surface of the negative lens facing the double convex lens;
- $rm$: the radius of curvature of the surface of the double convex lens facing the negative lens;
- $f4$: the focal length of the fourth lens group; and
- $fw$: the focal length at the wide end of the overall lens system.

4. A variable power projection lens comprising, in order from a magnifying side, a first lens group having positive power, a second lens group having negative power, a third lens group having positive power, and a fourth lens group having positive power, wherein at least two lens groups of said first, second, and third lens groups are movable along the optical axis direction to vary an image magnification and to focus, said variable power projection lens satisfying the following condition:

$$|f\alpha|>5fw$$

where
- $f\alpha$: the composite focal length at the wide end from the first lens group to the third lens group; and
- $fw$: the focal length at the wide end of the overall lens system;

wherein said third lens group comprises a single positive lens, and satisfies the following condition:

$$f3>1.5fw$$

where
- $f3$: the focal length of the third lens group; and
- $fw$: the focal length at the wide end of the overall lens system.

5. A variable power projection lens comprising, in order from a magnifying side, a first lens group having positive power, a second lens group having negative power, a third lens group having positive power, and a fourth lens group having positive power, wherein at least two lens groups of said first, second, and third lens groups are movable along the optical axis direction to vary an image magnification and to focus, said second lens group comprising a positive lens disposed closest to a minifying side of which the surface closest to the minifying side is convex, and the following condition is satisfied:

$$-0.8fw<R2<-0.3fw$$

where
- R2: the radius of curvature of the convex lens surface; and
- $fw$: the focal length at the wide end of the overall lens system.

6. The variable power projection lens according to claim 5, wherein said variable power projection lens satisfies the following condition:

$$|f\alpha|>5fw$$

where
- $f\alpha$: the composite focal length at the wide end from the first lens group to the third lens group.

7. A variable power projection lens comprising, in order from a magnifying side, a first lens group having positive power, a second lens group having negative power, a third lens group having positive power, and a fourth lens group having positive power, wherein at least two lens groups of said first, second, and third lens groups are movable along the optical axis direction to vary an image magnification and to focus, said first and fourth lens groups are fixed, and said second and third lens groups are movable along the optical axis direction to vary the image magnification and to focus said variable power projection lens satisfying the following condition:

$$|f\alpha|>5fw$$

where
- $f\alpha$: the composite focal length at the wide end from first lens group to the third lens group; and
- $fw$: the focal length at the wide end of the overall lens system.

8. A variable power projection lens comprising, in order from a magnifying side, a first lens group having positive power, a second lens group having negative power, a third lens group having positive power, and a fourth lens group having positive power, wherein at least two lens groups of said first, second, and third lens groups are movable along the optical axis direction to vary an image magnification and to focus, said third and fourth lens groups are fixed, and said first and second lens groups are movable along the optical axis direction to vary the image magnification, and said first lens group is separately movable along the optical axis direction to focus, said variable power protection lens satisfying the following condition:

$$|f\alpha|>5fw$$

where
- $f\alpha$: the composite focal length at the wide end from the first lens group to the third lens group; and
- $fw$: the focal length at the wide end of the overall lens system.

9. A variable power projection lens comprising, in order from a magnifying side, a first lens group having a positive power, a second lens group having a negative power, a third lens group having a positive power, and a fourth lens group having positive power, wherein at least two lens groups of said first, second and third lens groups are movable along the optical axis direction to vary an image magnification and to focus, said fourth lens group consisting of a negative lens and a positive lens arranged in order from the magnifying side and wherein the following condition is satisfied:

fbw/fw>1.75 where fw: the focal length at the wide end of the overall lens system;

fbw: the back focus at the wide end of the overall lens system.

10. The variable power projection lens according to claim 9, wherein said fourth lens group is fixed, and said second and third lens groups are movable along the optical axis direction to vary the image magnification, and said first lens group is separately movable along the optical axis direction to focus.

11. The variable power projection lens according to claim 9, wherein said variable power projection lens satisfies the following condition:

|fα|>5fw where fα: the composite focal length at the wide end from the first lens group to the third lens group.

* * * * *